(12) United States Patent
Chen et al.

(10) Patent No.: US 12,342,005 B2
(45) Date of Patent: Jun. 24, 2025

(54) VIDEO PLAYBACK METHOD AND APPARATUS, DEVICE, AND READABLE STORAGE MEDIUM

(71) Applicant: SHANGHAI HODE INFORMATION TECHNOLOGY CO., LTD., Shanghai (CN)

(72) Inventors: Junqi Chen, Shanghai (CN); Mengyuan Tang, Shanghai (CN); Ruipeng Chen, Shanghai (CN); Le Yin, Shanghai (CN); Weixuan Hu, Shanghai (CN); Xiaoxuan Zhang, Shanghai (CN)

(73) Assignee: SHANGHAI HODE INFORMATION TECHNOLOGY CO., LTD., Shanghai (CN)

( * ) Notice: Subject to any disclaimer, the term of this patent is extended or adjusted under 35 U.S.C. 154(b) by 38 days.

(21) Appl. No.: 18/034,346

(22) PCT Filed: Aug. 9, 2021

(86) PCT No.: PCT/CN2021/111386
§ 371 (c)(1),
(2) Date: Apr. 27, 2023

(87) PCT Pub. No.: WO2022/095528
PCT Pub. Date: May 12, 2022

(65) Prior Publication Data
US 2024/0323458 A1    Sep. 26, 2024

(30) Foreign Application Priority Data
Nov. 5, 2020   (CN) .......................... 202011224848.4

(51) Int. Cl.
*H04N 21/231* (2011.01)
*H04N 21/238* (2011.01)
(Continued)

(52) U.S. Cl.
CPC ..... *H04N 21/23106* (2013.01); *H04N 21/238* (2013.01); *H04N 21/242* (2013.01); *H04N 21/26241* (2013.01); *H04N 21/654* (2013.01)

(58) Field of Classification Search
CPC .............. H04N 21/238; H04N 21/242; H04N 21/26241; H04N 21/23103
See application file for complete search history.

(56) References Cited

U.S. PATENT DOCUMENTS 10,536,741 B1 *  1/2020  Madison ............ H04N 21/8456
10,735,825 B1    8/2020  Comito et al.
(Continued)

FOREIGN PATENT DOCUMENTS

CN   102055789 A    5/2011
CN   103338272 A   10/2013
(Continued)

OTHER PUBLICATIONS

International Patent Application No. PCT/CN2021/111386; Int'l Search Report; dated Oct. 26, 2021; 3 pages.

*Primary Examiner* — Ngoc K Vu
(74) *Attorney, Agent, or Firm* — BakerHostetler (57) ABSTRACT

This application discloses techniques of playing videos. The techniques comprise caching a video resource of a target onto a plurality of content delivery network (CDN) nodes; establishing a long link with each of a plurality of client computing devices in response to detecting that the plurality of client computing devices access a playback page of the target video; simultaneously sending, via the established long links, signals indicative of a start state of the target video to all of the plurality of client computing devices, wherein each of the plurality of client computing devices simultaneously plays the video resource while separately obtaining the video resource from a corresponding CDN node; simultaneously sending, via the established long links,
(Continued)

signals indicative of an end state of the target video to all of the plurality of client computing devices that access the playback page.

8 Claims, 4 Drawing Sheets

(51) Int. Cl.
*H04N 21/242* (2011.01)
*H04N 21/262* (2011.01)
*H04N 21/654* (2011.01)

(56) References Cited

U.S. PATENT DOCUMENTS

| | | | |
|---|---|---|---|
| 2017/0332113 A1 | 11/2017 | Haritaoglu et al. | |
| 2018/0203589 A1* | 7/2018 | Menand | G08C 17/02 |
| 2020/0186859 A1 | 6/2020 | Gazzini et al. | |
| 2022/0070524 A1* | 3/2022 | Iyer | H04N 21/2393 |
| 2022/0385989 A1* | 12/2022 | Qiang | H04N 21/2187 |

FOREIGN PATENT DOCUMENTS

| | | | | |
|---|---|---|---|---|
| CN | 103731398 A | | 4/2014 | |
| CN | 103813205 A | * | 5/2014 | |
| CN | 106101851 A | | 11/2016 | |
| CN | 106488294 A | | 3/2017 | |
| CN | 106534216 A | | 3/2017 | |
| CN | 107360475 A | | 11/2017 | |
| CN | 107733972 A | | 2/2018 | |
| CN | 107800585 A | | 3/2018 | |
| CN | 109672911 A | | 4/2019 | |
| CN | 109756756 A | | 5/2019 | |
| CN | 110620761 A | | 12/2019 | |
| CN | 111107386 A | | 5/2020 | |
| CN | 111372100 A | | 7/2020 | |
| CN | 112437329 A | | 3/2021 | |

* cited by examiner

VIDEO PLAYBACK METHOD AND APPARATUS, DEVICE, AND READABLE STORAGE MEDIUM

CROSS-REFERENCE TO RELATED APPLICATIONS

This application is the U.S. National Stage of International Application No. PCT/CN2021/111386, filed on Aug. 9, 2021, which claims priority to Chinese Patent Application No. 202011224848.4, filed on Nov. 5, 2020, and entitled "VIDEO PLAYBACK METHOD, APPARATUS, AND DEVICE, AND READABLE STORAGE MEDIUM", both of which are incorporated herein by reference in their entireties.

TECHNICAL FIELD

This application relates to the field of computer technologies, and in particular, to a video playback method, apparatus, and device, and a readable storage medium.

BACKGROUND

When a function of synchronously playing a specific video on a plurality of clients needs to be implemented, currently, a solution in the industry is that a live streaming manner is used to ensure that all users watching a video are in same video playback progress. However, live streaming has a high requirement for real-time performance of a content delivery network (CDN), and each CDN node needs to obtain latest video stream data in time, so that a user can obtain a latest video resource in time. Otherwise, a frame freezing case occurs. In addition, live streaming is performed on real-time data, and the video stream data is not cached at the CDN node. In this case, to ensure watching experience of the user, a large quantity of CDN nodes need to be configured, so that the user can obtain the video resource from a closest CDN node. The inventors realize that how to synchronously play a same video on a plurality of clients more efficiently and smoothly becomes a technical problem that needs to be resolved urgently by a person skilled in the art.

SUMMARY

An objective of this application is to provide a video playback method, apparatus, and device, and a readable storage medium, to more efficiently and smoothly achieve an effect of simultaneously playing a same video on a plurality of client computing devices.

According to an aspect of this application, a video playback method is provided. The method is applied to a video server, and includes:
caching a video resource of a target video to each content delivery network (CDN) node;
establishing a long link with a client when it is detected that the client accesses a playback page of the target video;
simultaneously sending, by using established long links when a playback start instruction is received, video start state signaling to all clients that access the playback page, so that each client separately obtains the video resource from a corresponding CDN node, and simultaneously plays the video resource; and
when a playback end instruction is received, simultaneously sending, by using the established long links, video end state signaling to all the clients that access the playback page.

Optionally, after the simultaneously sending, by using established long links when a playback start instruction is received, video start state signaling to all clients that access the playback page, the method further includes:
starting a timer to record video playback progress; and
when a progress query request sent by the client is received by using an http interface, sending the video playback progress determined based on the timer to the client by using the http interface.

Optionally, the method further includes:
receiving, by using the http interface, bullet-screen comment information sent by any client that accesses the playback page; and
simultaneously forwarding, by using the established long link, the bullet-screen comment information to another client that accesses the playback page.

To implement the foregoing objective, this application further provides a video playback method. The method is applied to a client, and includes:
establishing a long link with a video server when a playback page of a target video is accessed;
when video start state signaling sent by the video server is received by using the long link, obtaining a video resource of the target video from a corresponding CDN node, and playing the video resource, where the CDN node is configured to cache the video resource of the target video; and
receiving, by using the long link, video end state signaling sent by the video server.

Optionally, after the establishing a long link with a video server when a playback page of a target video is accessed, the method further includes:
when it is detected that a background or another page is switched back to the playback page, sending a progress query request to the video server by using an http interface;
receiving, by using the http interface, video playback progress sent by the video server, where the video playback progress is determined based on a timer started by the video server; and
playing the target video based on the video playback progress.

Optionally, the method further includes:
displaying bullet-screen comment information in the playback page when the bullet-screen comment information is obtained; and
sending the bullet-screen comment information to the video server by using the http interface, so that the video server simultaneously forwards, by using the established long link, the bullet-screen comment information to another client that accesses the playback page.

To implement the foregoing objective, this application further provides a video playback apparatus. The video playback apparatus is applied to a video server, and includes:
a cache module, configured to cache a video resource of a target video to each content delivery network (CDN) node;
a connection establishment module, configured to establish a long link with a client when it is detected that the client accesses a playback page of the target video;
a start module, configured to simultaneously send, by using established long links when a playback start instruction is received, video start state signaling to all clients that access the playback page, so that each client separately obtains the video resource from a corresponding CDN node, and simultaneously plays the video resource; and an end module, configured to: when a playback end instruction is received, simultaneously send, by using the established long links, video end state signaling to all the clients that access the playback page.

To implement the foregoing objective, this application further provides a video playback apparatus. The video playback apparatus is applied to a user, and includes:

an access module, configured to establish a long link with a video server when accessing a playback page of a target video;

a playback module, configured to: when video start state signaling sent by the video server is received by using the long link, obtain a video resource of the target video from a corresponding CDN node, and play the video resource, where the CDN node is configured to cache the video resource of the target video; and a receiving module, configured to receive, by using the long link, video end state signaling sent by the video server.

To implement the foregoing objective, this application further provides a computer device. The computer device specifically includes a memory, a processor, and computer-readable instructions that are stored in the memory and that are capable of being run on the processor, and when the processor executes the computer-readable instructions, the following steps are performed:

caching a video resource of a target video to each content delivery network (CDN) node;

establishing a long link with a client when it is detected that the client accesses a playback page of the target video;

simultaneously sending, by using established long links when a playback start instruction is received, video start state signaling to all clients that access the playback page, so that each client separately obtains the video resource from a corresponding CDN node, and simultaneously plays the video resource; and when a playback end instruction is received, simultaneously sending, by using the established long links, video end state signaling to all the clients that access the playback page.

To implement the foregoing objective, this application further provides a computer device. The computer device includes a memory, a processor, and computer-readable instructions that are stored in the memory and that are capable of being run on the processor, and when the processor executes the computer-readable instructions, the following steps are performed:

establishing a long link with a video server when a playback page of a target video is accessed;

when video start state signaling sent by the video server is received by using the long link, obtaining a video resource of the target video from a corresponding CDN node, and playing the video resource, where the CDN node is configured to cache the video resource of the target video; and receiving, by using the long link, video end state signaling sent by the video server.

To implement the foregoing objective, this application further provides a computer-readable storage medium. The computer-readable storage medium stores computer-readable instructions, and the computer-readable instructions are executed by a processor to perform the following steps:

caching a video resource of a target video to each content delivery network (CDN) node;

establishing a long link with a client when it is detected that the client accesses a playback page of the target video;

simultaneously sending, by using established long links when a playback start instruction is received, video start state signaling to all clients that access the playback page, so that each client separately obtains the video resource from a corresponding CDN node, and simultaneously plays the video resource; and when a playback end instruction is received, simultaneously sending, by using the established long links, video end state signaling to all the clients that access the playback page.

To implement the foregoing objective, this application further provides a computer-readable storage medium. The computer-readable storage medium stores computer-readable instructions, and the computer-readable instructions are executed by a processor to perform the following steps:

establishing a long link with a video server when a playback page of a target video is accessed;

when video start state signaling sent by the video server is received by using the long link, obtaining a video resource of the target video from a corresponding CDN node, and playing the video resource, where the CDN node is configured to cache the video resource of the target video; and receiving, by using the long link, video end state signaling sent by the video server.

According to the video playback method, apparatus, and device, and the readable storage medium provided in this application, the video server simultaneously sends playback state signaling to a plurality of clients by using the long links established between the video server and the clients, to synchronize video playback progress of all the clients, thereby achieving an effect that a plurality of users simultaneously watch a specific video on line. In this application, an on-demand manner is used. A complete video resource of the target video is stored in the CDN node in advance, so that the client can directly obtain the video resource from the CDN node for playback. In this way, there is no frame freezing phenomenon, video playback is smoother, and user experience is better. In addition, the bullet-screen comment information is forwarded by using the long link, so that the bullet-screen comment information displayed on all the clients is consistent, thereby bringing live streaming experience to the users.

BRIEF DESCRIPTION OF DRAWINGS

Other advantages and benefits will become clear to a person of ordinary skill in the art by reading the following detailed descriptions of implementations. The accompanying drawings are merely used to show implementations, and are not intended to limit this application. In addition, throughout the accompanying drawings, a same component is represented by using a same reference symbol. In the accompanying drawings.

DESCRIPTION OF EMBODIMENTS

To make the objectives, technical solutions, and advantages of this application clearer and more comprehensible, the following further describes this application in detail with reference to the accompanying drawings and embodiments. It should be understood that the specific embodiments described herein are merely used to explain this application but are not intended to limit this application. All other embodiments obtained by a person of ordinary skill in the art based on embodiments of this application without involving creative efforts shall fall within the protection scope of this application.

Embodiment 1

Figure 1:
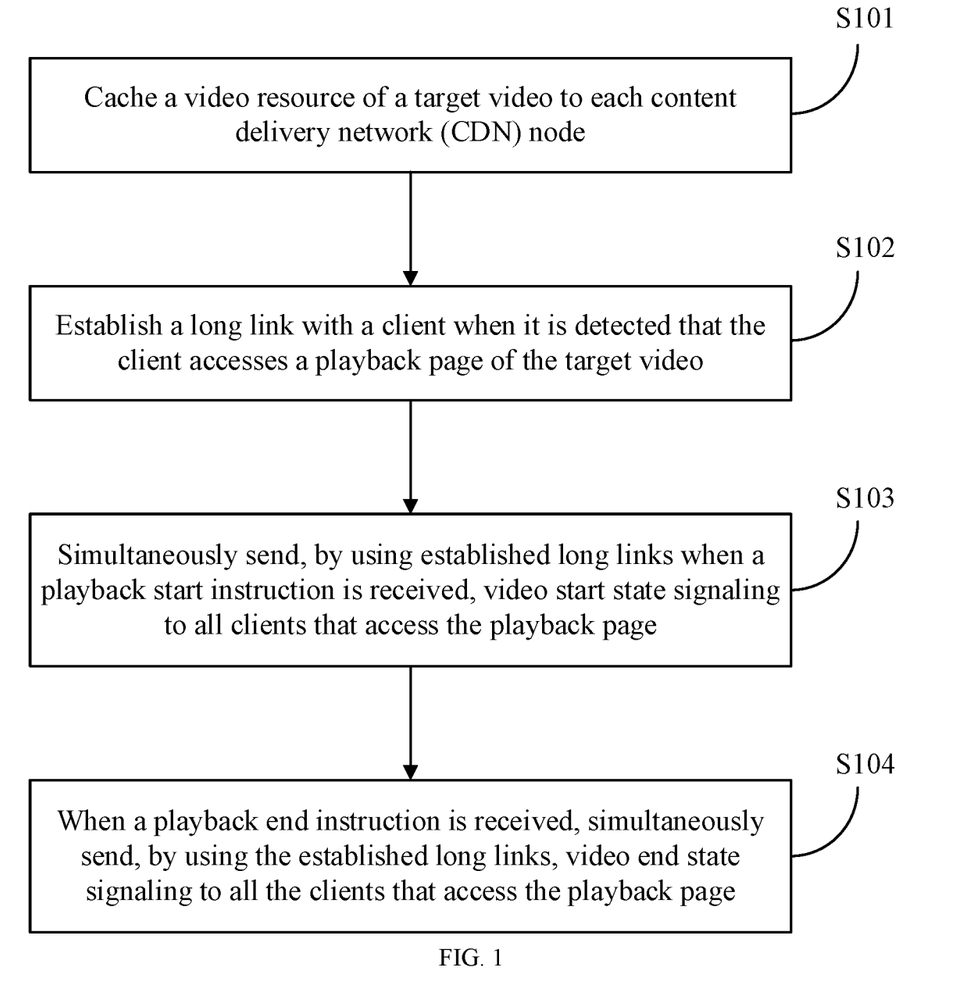
FIG. 1 is an optional schematic flowchart of a video playback method according to Embodiment 1.

This embodiment of this application provides a video playback method. The method is applied to a video server. As shown in FIG. 1, the method specifically includes the following steps:

Step S101: Cache a video resource of a target video to each CDN node.

In this embodiment, an on-demand manner is used. A complete video resource of the target video is stored in the CDN node in advance for use by a client. A difference between the on-demand manner and a live streaming manner is as follows: When the live streaming manner is used, a requirement for real-time performance of the CDN node is high, and each CDN node needs to obtain the video resource in time for use by the client. Therefore, once the CDN node cannot obtain the video resource in time, a frame freezing phenomenon occurs on the client. However, in the on-demand manner, a requirement for real-time performance of the CDN node is not high. When the on-demand manner is used, the complete video resource of the target video is delivered to each CDN node in advance, so that a user can directly obtain the video resource from the CDN node, and there is no frame freezing phenomenon. Therefore, smoothness of video playback is ensured.

Step S102: Establish a long link with a client computing device (i.e., client) when it is detected that the client accesses a playback page of the target video.

The on-demand manner cannot ensure that the target video is synchronously played on a plurality of client computing devices. Therefore, in this embodiment, when the client accesses the playback page of the target video, the long link is established between the video server and the client until the playback page is closed on the client. Long links are established between the video server and a plurality of client computing devices, so that the video server can simultaneously send signaling to the plurality of client computing devices, thereby ensuring signaling consistency among the clients.

Specifically, the video server simultaneously sends signals to the client computing devices by using the long links. The signals include playback states of a video and/or a playback progress of a video. The video server sends the signaling by using the long link to ensure real-time arrival of the signaling at the client.

Step S103: Simultaneously send, by using established long links when a playback start instruction is received, video start state signaling to all clients that access the playback page, so that each client separately obtains the video resource from a corresponding CDN node, and simultaneously plays the video resource.

In this embodiment, the on-demand manner is combined with long link state synchronization, to implement an effect of synchronously playing the target video on the plurality of clients, thereby bringing experience of watching live streaming to users. In addition, the foregoing combination is superior to live streaming in smoothness of video playback, and there is no frame freezing case.

Step S104: When a playback end instruction is received, simultaneously send, by using the established long links, video end state signaling to all the clients that access the playback page.

Specifically, after the simultaneously sending, by using established long links when a playback start instruction is received, video start state signaling to all clients that access the playback page, the method further includes:

Step A1: Start a timer to record video playback progress.

Step A2: When a progress query request sent by the client is received by using an http interface, send the video playback progress determined based on the timer to the client by using the http interface.

In this embodiment, the video server actively sends the signaling that includes the video playback state and/or the video playback progress to the client by using the long link. Video playback states include a video start state and a video end state. However, when the client switches the playback page to another page or run in a background, if the client switches the another page or running in the background back to the playback page again, the client needs to obtain a current video playback state and current video playback progress. Because the video server can only actively send the signaling to the client by using the long link, but the client cannot send signaling to the video server by using the long link, the client needs to send, to the video server by using the http (Hypertext Transfer Protocol) interface, a request used to obtain the video playback state and/or the video playback progress, the video server feeds back the current video playback state and/or the current video playback progress to the client by using the http interface, and the client performs a video seek operation based on the current video playback state and the current video playback progress, to play the target video based on the video playback progress that is fed back, and adjust playback content.

In addition, the video server starts the timer to identify current playback progress of the target video. When the client sends the progress query request by using the http interface, the video server determines a video playback record based on the timer.

Further, the method further includes:

Step B1: Receive, by using the http interface, bullet-screen comment information sent by any client that accesses the playback page.

Step B2: Simultaneously forward, by using the established long link, the bullet-screen comment information to another client that accesses the playback page.

In this embodiment, when a user sends bullet-screen comment information by using a client in a process of watching the target video, the bullet-screen comment information is first displayed in a playback page of the client, and the bullet-screen comment information is sent to the video server by using the http interface. When receiving the bullet-screen comment information, the video server sends, by using long links, the bullet-screen comment information to all other clients that access the playback page (that is, watch the target video), and then the other clients display the bullet-screen comment information in the playback page. Because all the clients receive the bullet-screen comment information at substantially the same time, all users see the bullet-screen comment information almost synchronously, thereby achieving an effect of watching a live video.

Embodiment 2

Figure 2:
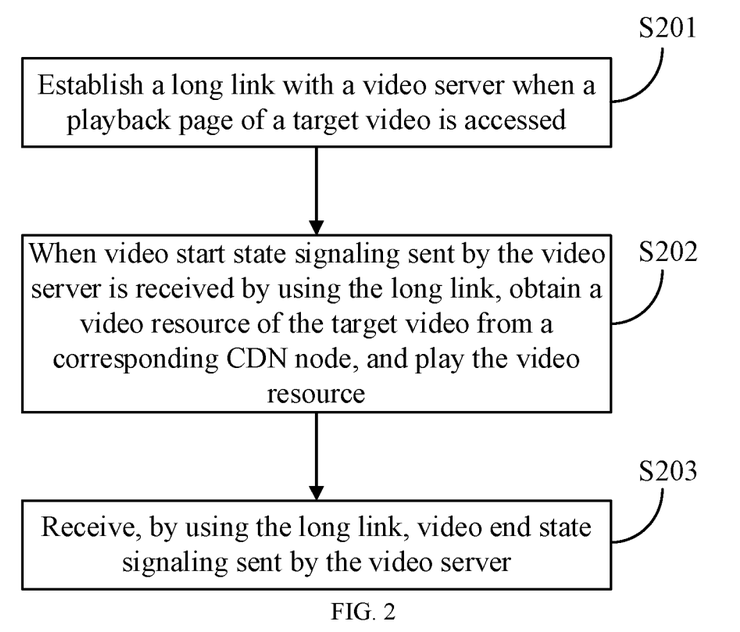
FIG. 2 is an optional schematic flowchart of a video playback method according to Embodiment 2.

This embodiment of this application provides a video playback method. The method is applied to a client. As shown in FIG. 2, the method specifically includes the following steps:

Step S201: Establish a long link with a video server when a playback page of a target video is accessed.

In this embodiment, when the client accesses the playback page of the target video, the long link is established between the video server and the client until the playback page is closed on the client. Long links are established between the video server and a plurality of clients, so that the video server can simultaneously send signaling to the plurality of clients, thereby ensuring signaling consistency among the clients.

Specifically, the video server sends the signaling to the client by using the long link. The signaling includes a video playback state and/or video playback progress. The video server sends the signaling by using the long link to ensure real-time arrival of the signaling at the client.

Step S202: When video start state signaling sent by the video server is received by using the long link, obtain a video resource of the target video from a corresponding CDN node, and play the video resource, where the CDN node is configured to cache the video resource of the target video.

In this embodiment, a live streaming effect is implemented in an on-demand manner, that is, an effect of synchronously playing a same video on a plurality of clients is implemented in an on-demand manner. A difference between the on-demand manner and a live streaming manner is as follows: When the live streaming manner is used, a requirement for real-time performance of the CDN node is high, and each CDN node needs to obtain the video resource in time for use by the client. Therefore, once the CDN node cannot obtain the video resource in time, a frame freezing phenomenon occurs on the client. However, in the on-demand manner, a requirement for real-time performance of the CDN node is not high. When the on-demand manner is used, a complete video resource of the target video is delivered to each CDN node in advance, so that a user can directly obtain the video resource from the CDN node, and there is no frame freezing phenomenon. Therefore, smoothness of video playback is ensured.

Specifically, the obtaining a video resource of the target video from a corresponding CDN node includes:

Step C1: Send a playback address query request to the video server by using an http interface, where the playback address query request includes identification information of the target video.

Step C2: Receive, by using the http interface, playback address information that corresponds to the identification information and that is sent by the video server.

Step C3: Obtain, from the CDN node, the video resource corresponding to the playback address information.

In this embodiment, when the target video is started, the video server sends, by using long links, the video start state signaling to all clients that access the playback page. When receiving the video start state signaling, the client actively requests a playback address, and plays the target video based on the playback address.

Step S203: Receive, by using the long link, video end state signaling sent by the video server. Specifically, after the establishing a long link with a video server when a playback page of a target video is accessed, the method further includes:

Step D1: When it is detected that a background or another page is switched back to the playback page, send a progress query request to the video server by using the http interface.

Step D2: Receive, by using the http interface, video playback progress sent by the video server, where the video playback progress is determined based on a timer started by the video server.

Step D3: Play the target video based on the video playback progress.

In this embodiment, the video server actively sends the signaling that includes the video playback state and/or the video playback progress to the client by using the long link. Video playback states include a video start state and a video end state. However, when the client switches the playback page to the background or another page, if the client switches the background or another page back to the playback page again, the client needs to obtain a current video playback state and current video playback progress. Because the video server can only actively send the signaling to the client by using the long link, but the client cannot send signaling to the video server by using the long link, the client needs to send, to the video server by using the http interface, a request used to obtain the video playback state and/or the video playback progress, the video server feeds back the current video playback state and/or the current video playback progress to the client by using the http interface, and the client performs a video seek operation based on the current video playback state and the current video playback progress, to play the target video based on the video playback progress that is fed back, and adjust playback content.

In addition, the video server starts the timer to identify current playback progress of the target video. When the client sends the progress query request by using the http interface, the video server determines a video playback record based on the timer.

Further, the method further includes:

Step E1: Display bullet-screen comment information in the playback page when the bullet-screen comment information is obtained.

Step E2: Send the bullet-screen comment information to the video server by using the http interface, so that the video server simultaneously forwards, by using the established long link, the bullet-screen comment information to another client that accesses the playback page.

In this embodiment, when a user sends bullet-screen comment information by using a client in a process of watching the target video, the bullet-screen comment information is first displayed in a playback page of the client, and the bullet-screen comment information is sent to the video server by using the http interface. When receiving the bullet-screen comment information, the video server sends, by using long links, the bullet-screen comment information to all other clients that access the playback page (that is, watch the target video), and then the other clients display the bullet-screen comment information in the playback page. Because all the clients receive the bullet-screen comment information at substantially the same time, all users see the bullet-screen comment information almost synchronously, thereby achieving an effect of watching a live video.

In this embodiment, the on-demand manner is combined with long link state synchronization, to implement an effect of synchronously playing the target video on the plurality of clients, thereby bringing experience of watching live streaming to users. In addition, the foregoing combination is superior to live streaming in smoothness of video playback, and there is no frame freezing case.

Embodiment 3

Figure 3:
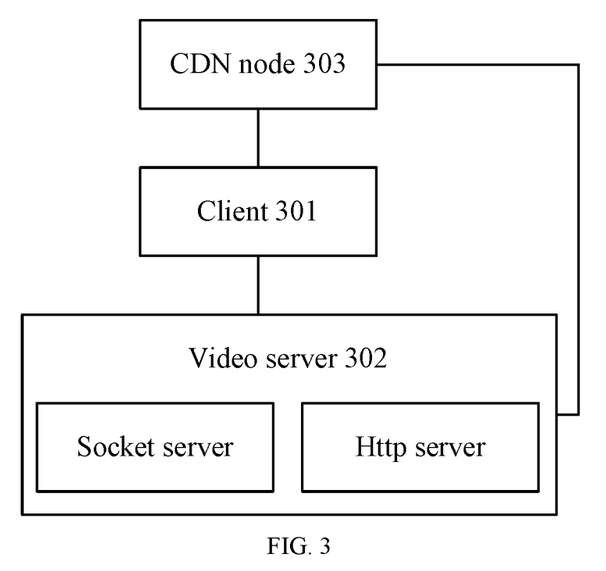
FIG. 3 is an optional schematic flowchart of a video playback method according to Embodiment 3.

This embodiment of this application provides a video playback method. As shown in FIG. 3, the method is applied to a client 301, a video server 302, and a CDN node 303, where the video server includes a socket server and an http server. The method specifically includes the following steps:

Step 1: The video server caches a complete video resource of a target video to each CDN node.

Step 2: When any client accesses a playback page of the target video, establish a long link between the client and the socket server of the video server.

The socket server is configured to provide signaling to the client and forward bullet-screen comment information sent by the client.

Step 3: When receiving a playback start instruction, the video server simultaneously sends, by using established long links, video start state signaling to all clients that access the playback page.

Step 4: After sending the video start state signaling, the video server starts a timer to record video playback progress.

Step 5: When the client receives the video start state signaling, the client obtains the video resource of the target video from a corresponding CDN node, and plays the video resource.

Step 6: When the client switches a background or another page back to the playback page, send a progress query request to the http server of the video server by using an http interface.

The http server provides an interface for the client to actively request a playback state and playback progress, so that the client can obtain a latest playback state and latest playback progress after switching the background or another page back to the playback page.

Step 7: The video server determines the video playback progress based on the timer, and sends the video playback progress to the client by using the http server.

Step 8: The client obtains the video resource of the target video from the corresponding CDN node again based on the video playback progress, and plays the video resource again.

Step 9: When receiving a playback end instruction, the video server simultaneously sends, by using the established long links, video end state signaling to all the clients that access the playback page.

Further, the method further includes:

Step F1: For any client that accesses the playback page, display bullet-screen comment information in the playback page when the bullet-screen comment information is obtained.

Step F2: The client sends the bullet-screen comment information to the http server of the video server by using the http interface.

Step F3: The video server simultaneously forwards, by using the established long link, the bullet-screen comment information to another client that accesses the playback page.

Embodiment 4

Figure 4:
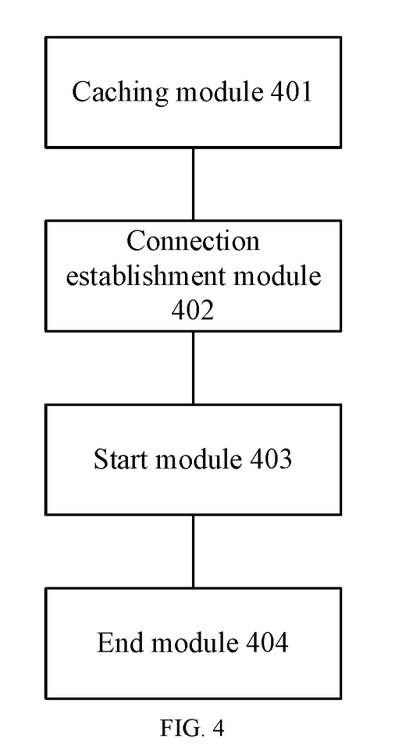
FIG. 4 is an optional schematic diagram of a composition structure of a video playback apparatus according to Embodiment 4.

This embodiment of this application provides a video playback apparatus. The apparatus is applied to a video server. As shown in FIG. 4, the apparatus specifically includes the following components:

a cache module 401, configured to cache a video resource of a target video to each content delivery network (CDN) node;

a connection establishment module 402, configured to establish a long link with a client when it is detected that the client accesses a playback page of the target video;

a start module 403, configured to simultaneously send, by using established long links when a playback start instruction is received, video start state signaling to all clients that access the playback page, so that each client separately obtains the video resource from a corresponding CDN node, and simultaneously plays the video resource; and an end module 404, configured to: when a playback end instruction is received, simultaneously send, by using the established long links, video end state signaling to all the clients that access the playback page.

Specifically, the apparatus further includes:

a timing module, configured to: start a timer to record video playback progress; and when a progress query request sent by the client is received by using an http interface, send the video playback progress determined based on the timer to the client by using the http interface.

Further, the apparatus further includes:

a forwarding module, configured to: receive, by using the http interface, bullet-screen comment information sent by any client that accesses the playback page; and simultaneously forward, by using the established long link, the bullet-screen comment information to another client that accesses the playback page.

Embodiment 5

Figure 5:
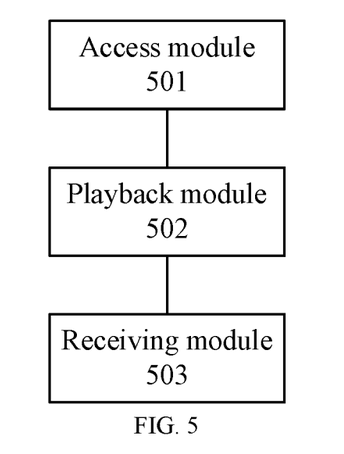
FIG. 5 is an optional schematic diagram of a composition structure of a video playback apparatus according to Embodiment 5.

This embodiment of this application provides a video playback apparatus. The apparatus is applied to a client. As shown in FIG. 5, the apparatus specifically includes the following components:

an access module 501, configured to establish a long link with a video server when accessing a playback page of a target video;

a playback module 502, configured to: when video start state signaling sent by the video server is received by using the long link, obtain a video resource of the target video from a corresponding CDN node, and play the video resource, where the CDN node is configured to cache the video resource of the target video; and a receiving module 503, configured to receive, by using the long link, video end state signaling sent by the video server.

Specifically, the apparatus further includes:

a switching module, configured to: when it is detected that a background or another page is switched back to the playback page, send a progress query request to the video server by using an http interface; receive, by using the http interface, video playback progress sent by the video server, where the video playback progress is determined based on a timer started by the video server; and play the target video based on the video playback progress.

Further, the apparatus further includes:

a bullet-screen comment module, configured to: display bullet-screen comment information in the playback page when the bullet-screen comment information is obtained; and send the bullet-screen comment information to the video server by using the http interface, so that the video server simultaneously forwards, by using the established long link, the bullet-screen comment information to another client that accesses the playback page.

Embodiment 6

Figure 6:
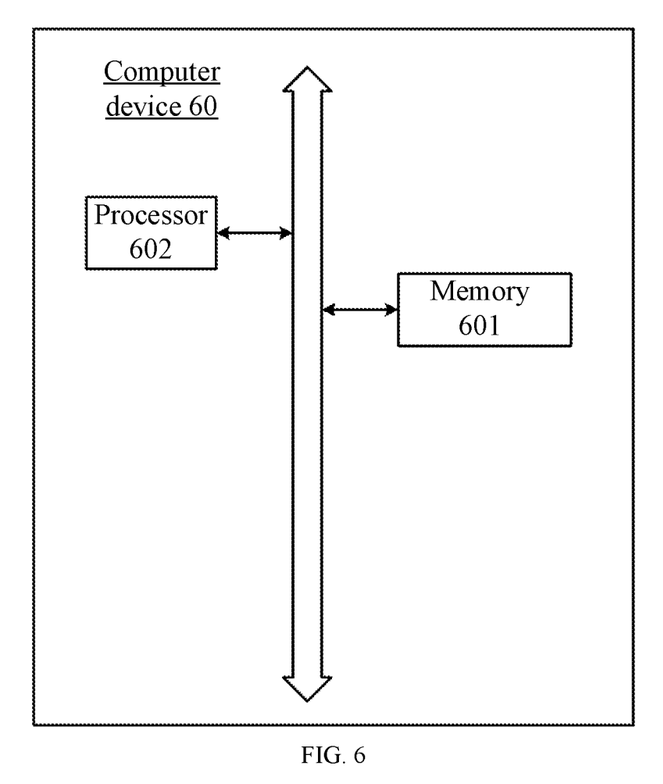
FIG. 6 is an optional schematic diagram of a hardware architecture of a computer device according to Embodiment 6.

This embodiment further provides a computer device, for example, a smartphone, a tablet computer, a notebook computer, a desktop computer, a rack server, a blade server, a tower server, or a cabinet server (including an independent server or a server cluster including a plurality of servers) that can execute a program. As shown in FIG. 6, the computer device 60 in this embodiment includes but is not limited to at least a memory 601 and a processor 602 that can be communicatively connected to each other by using a system bus. It should be noted that FIG. 6 shows only the computer device 60 that has the components 601 and 602. However, it should be understood that not all the shown components are required to be implemented, and more or fewer components may alternatively be implemented.

In this embodiment, the memory 601 (that is, a readable storage medium) includes a flash memory, a hard disk, a multimedia card, a card memory (for example, an SD memory or a DX memory), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disc, or the like. In some embodiments, the memory 601 may be an internal storage unit of the computer device 60, for example, a hard disk or a memory of the computer device 60. In some other embodiments, the memory 601 may alternatively be an external storage device of the computer device 60, for example, a plug-in hard disk, a smart media card (SMC), a secure digital (SD) card, or a flash card (Flash Card) that is disposed on the computer device 60. Certainly, the memory 601 may alternatively include both an internal storage unit of the computer device 60 and an external storage device of the computer device 60. In this embodiment, the memory 601 is usually configured to store an operating system and various types of application software that are installed on the computer device 60. In addition, the memory 601 may be further configured to temporarily store various types of data that have been output or are to be output.

The processor 602 may be a central processing unit (CPU), a controller, a microcontroller, a microprocessor, or another data processing chip in some embodiments. The processor 602 is usually configured to control overall operation of the computer device 60.

Specifically, in this embodiment, the processor 602 is configured to execute a program that is of a video playback method and that is stored in the memory 601, and when the program of the video playback method is executed, the following steps are implemented:

caching a video resource of a target video to each content delivery network (CDN) node;

establishing a long link with a client when it is detected that the client accesses a playback page of the target video;

simultaneously sending, by using established long links when a playback start instruction is received, video start state signaling to all clients that access the playback page, so that each client separately obtains the video resource from a corresponding CDN node, and simultaneously plays the video resource; and when a playback end instruction is received, simultaneously sending, by using the established long links, video end state signaling to all the clients that access the playback page.

For a process of a specific embodiment of the foregoing method steps, refer to the first embodiment. Details are not described herein again in this embodiment.

In addition, in this embodiment, the processor 602 is further configured to execute a program that is of a video playback method and that is stored in the memory 601, and when the program of the video playback method is executed, the following steps are further implemented:

establishing a long link with a video server when a playback page of a target video is accessed;

when video start state signaling sent by the video server is received by using the long link, obtaining a video resource of the target video from a corresponding CDN node, and playing the video resource, where the CDN node is configured to cache the video resource of the target video; and receiving, by using the long link, video end state signaling sent by the video server.

For a process of a specific embodiment of the foregoing method steps, refer to the second embodiment. Details are not described herein again in this embodiment.

Embodiment 7

This embodiment further provides a computer-readable storage medium, for example, a flash memory, a hard disk, a multimedia card, a card memory (for example, an SD memory or a DX memory), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disk, a server, or an application (App) store. The computer-readable storage medium stores computer-readable instructions. When the computer-readable instructions are executed by a processor, the following method steps are implemented:

caching a video resource of a target video to each content delivery network (CDN) node;

establishing a long link with a client when it is detected that the client accesses a playback page of the target video;

simultaneously sending, by using established long links when a playback start instruction is received, video start state signaling to all clients that access the playback page, so that each client separately obtains the video resource from a corresponding CDN node, and simultaneously plays the video resource; and when a playback end instruction is received, simultaneously sending, by using the established long links, video end state signaling to all the clients that access the playback page.

For a process of a specific embodiment of the foregoing method steps, refer to the first embodiment. Details are not described herein again in this embodiment.

In addition, when the computer-readable instructions are executed by the processor, the following method steps are further implemented:

establishing a long link with a video server when a playback page of a target video is accessed;

when video start state signaling sent by the video server is received by using the long link, obtaining a video resource of the target video from a corresponding CDN node, and playing the video resource, where the CDN node is configured to cache the video resource of the target video; and receiving, by using the long link, video end state signaling sent by the video server.

For a process of a specific embodiment of the foregoing method steps, refer to the second embodiment. Details are not described herein again in this embodiment.

It should be noted that in this specification, the term "include", "comprise", or any other variant thereof is intended to cover non-exclusive inclusion, so that a process, method, article, or apparatus that includes a series of elements includes those elements and other elements that are not explicitly listed or elements inherent to the process, method, article, or apparatus. In the absence of more restrictions, the element defined by the statement "includes one . . . " does not exclude the existence of another identical element in the process, method, article, or apparatus that includes the element.

The serial numbers in the foregoing embodiments of this application are merely used for description, and do not represent advantages or disadvantages of the embodiments.

According to the descriptions of the foregoing implementations, a person skilled in the art may clearly understand that the foregoing embodiment methods may be implemented through a combination of software and a required universal hardware platform, or certainly may be implemented by using hardware. However, in many cases, the former is a better implementation.

The foregoing descriptions are merely embodiments of this application, and are not intended to limit the scope of this application. Any equivalent structure or equivalent process change made based on the content of this specification and the accompanying drawings of this application is directly or indirectly applied to other related technical fields, and shall fall within the protection scope of this application.

What is claimed is:

1. A method of playing videos, applied to a video server, wherein the method comprises:
    caching a video resource of a target video onto a plurality of content delivery network (CDN) nodes using an on-demand manner;
    establishing a long link with each of a plurality of client computing devices in response to detecting that the plurality of client computing devices access a playback page of the target video, wherein established long links enable the video server to simultaneously send signals to the plurality of client computing devices for synchronously playing the target video on the plurality of client computing devices;
    simultaneously sending, via the established long links, signals indicative of a start state of the target video to all of the plurality of client computing devices that access the playback page when a playback start instruction is received, wherein each of the plurality of client computing devices simultaneously plays the video resource while separately obtaining the video resource from a corresponding CDN node among the plurality of CDN nodes;
    simultaneously sending, via the established long links, signals indicative of an end state of the target video to all of the plurality of client computing devices that access the playback page when a playback end instruction is received;
    wherein after the establishing a long link with each of a plurality of client computing devices in response to detecting that the plurality of client computing devices access a playback page of the target video, the method further comprises:
    receiving a progress query request from one of the plurality of client computing devices via an Hypertext Transfer Protocol (http) interface when the one of the plurality of client computing device is switched back to the playback page from another page or from running in a background;
    determining a playback progress of the target video based on a timer started by the video server; and
    transmitting information indicating the playback progress of the target video to the one of the plurality of client computing devices via the http interface, wherein the one of the plurality of client computing devices resumes playing the target video based on the playback progress of the target video.

2. The method according to claim 1, wherein the method further comprises:
    receiving, via the Hypertext Transfer Protocol (http) interface, information indicative of a bullet-screen comment sent by any of the plurality of client computing devices; and
    simultaneously forwarding, via the established long links, the information indicative of the bullet-screen comment to the other client computing devices among the plurality of client computing devices, and wherein the bullet-screen comment is approximately synchronously displayed on the plurality of client computing devices.

3. A method of playing videos, applied to a client computing device, wherein the method comprises:
    establishing a long link with a video server in response to a determination that a playback page of a target video is accessed, wherein establishment of long links between the video server and a plurality of client computing devices enables to simultaneously send signals from the video server to the plurality of client computing devices for synchronously playing the target video on the plurality of client computing devices, and wherein the client computing device is among the plurality of client computing devices;
    in response to receiving a signal indicative of a start state of the target video from the video server via the long link, obtaining a video resource of the target video from a corresponding content delivery network (CDN) node among a plurality of CDN nodes and playing the video resource, wherein the video resource of the target video has been cached onto the plurality of CDN nodes in an on-demand manner, and wherein the plurality of client computing devices simultaneously play the video resource while separately obtaining the video resource from their corresponding CDN nodes;

receiving a signal indicative of an end state of the target video from the video server via the long link;

wherein after the establishing a long link with a video server in response to a determination that a playback page of a target video is accessed, the method further comprises:

in response to detecting that the client computing device is switched back to the playback page from another page or from running in a background, sending a progress query request to the video server via an Hypertext Transfer Protocol (http) interface;

receiving information indicating a playback progress of the target video sent from the video server via the http interface, wherein the playback progress of the target video is determined based on a timer started by the video server; and resuming playing the target video based on the playback progress of the target video.

4. The method according to claim 3, wherein the method further comprises:

displaying a bullet-screen comment in the playback page of the target video on the client computing device when the bullet-screen comment is obtained from the client computing device; and sending, via the Hypertext Transfer Protocol (http), information indicative of the bullet-screen comment to the video server, wherein the information indicative of the bullet-screen comment is simultaneously forwarded by the video server to other client computing devices among the plurality of client computing devices that access the playback page via long links established between the video server and the other client computing devices, and wherein the bullet-screen comment is approximately synchronously displayed on the plurality of client computing devices.

5. A computer system, wherein the computer system comprises a memory, a processor, and computer-readable instructions that are stored in the memory and that are capable of being run on the processor, and wherein executions of the computer-readable instructions by the processor cause the computer system perform operations comprising:

caching a video resource of a target video onto a plurality of content delivery network (CDN) nodes using an on-demand manner;

establishing a long link with each of a plurality of client computing devices in response to detecting that the plurality of client computing devices access a playback page of the target video, wherein established long links enable a video server to simultaneously send signals to the plurality of client computing devices for synchronously playing the target video on the plurality of client computing devices;

simultaneously sending, via the established long links, signals indicative of a start state of the target video to all of the plurality of client computing devices that access the playback page when a playback start instruction is received, wherein each of the plurality of client computing devices simultaneously plays the video resource while separately obtaining the video resource from a corresponding CDN node among the plurality of CDN nodes;

simultaneously sending, via the established long links, signals indicative of an end state of the target video to all of the plurality of client computing devices that access the playback page when a playback end instruction is received;

wherein after the establishing a long link with each of a plurality of client computing devices in response to detecting that the plurality of client computing devices access a playback page of the target video, the operations further comprise:

receiving a progress query request from one of the plurality of client computing devices via an Hypertext Transfer Protocol (http) interface when the one of the plurality of client computing device is switched back to the playback page from another page or from running in a background;

determining a playback progress of the target video based on a timer started by the video server; and transmitting information indicating the playback progress of the target video to the one of the plurality of client computing devices via the http interface, wherein the one of the plurality of client computing devices resumes playing the target video based on the playback progress of the target video.

6. The computer system according to claim 5, wherein when the processor executes the computer-readable instructions, the computer system is caused to further perform operations comprise:

receiving, via the Hypertext Transfer Protocol (http) interface, information indicative of a bullet-screen comment sent by any of the plurality of client computing devices; and simultaneously forwarding, via the established long links, the information indicative of the bullet-screen comment to the other client computing devices among the plurality of client computing devices, and wherein the bullet-screen comment is approximately synchronously displayed on the plurality of client computing devices.

7. A computing device, wherein the computer device comprises a memory, a processor, and computer-readable instructions that are stored in the memory and that are capable of being run on the processor, and wherein executions of the computer-readable instructions by the processor cause the computing device to perform operations comprising:

establishing a long link with a video server in response to a determination that a playback page of a target video is accessed, wherein establishment of long links between the video server and a plurality of client computing devices enables to simultaneously send signals from the video server to the plurality of client computing devices for synchronously playing the target video on the plurality of client computing devices, and wherein the computing device is among the plurality of client computing devices;

in response to receiving a signal indicative of a start state of the target video from the video server via the long link, obtaining a video resource of the target video from a corresponding content delivery network (CDN) node among a plurality of CDN nodes and playing the video resource, wherein the video resource of the target video has been cached onto the plurality of CDN nodes in an on-demand manner, and wherein the plurality of client computing devices simultaneously play the video resource while separately obtaining the video resource from their corresponding CDN nodes;

receiving a signal indicative of an end state of the target video from the video server via the long link;

wherein after the establishing a long link with a video server in response to a determination that a playback page of a target video is accessed, the operations further comprise:

in response to detecting that the computing device is switched back to the playback page from another page or from running in a background, sending a progress query request to the video server via an Hypertext Transfer Protocol (http) interface;

receiving information indicating a playback progress of the target video sent from the video server via the http interface, wherein the playback progress of the target video is determined based on a timer started by the video server; and resuming playing the target video based on the playback progress of the target video.

8. The computing device according to claim 7, wherein when the processor executes the computer-readable instructions, the computing device is caused to further perform operations comprising:

displaying a bullet-screen comment in the playback page of the target video on the computing device when the bullet-screen comment is obtained from the computing device; and sending, via the Hypertext Transfer Protocol (http), information indicative of the bullet-screen comment to the video server, wherein the information indicative of the bullet-screen comment is simultaneously forwarded by the video server to other client computing devices among the plurality of client computing devices that access the playback page via long links established between the video server and the other client computing devices, and wherein the bullet-screen comment is approximately synchronously displayed on the plurality of client computing devices.

* * * * *